US006730277B2

United States Patent
Lee et al.

(12) United States Patent
(10) Patent No.: US 6,730,277 B2
(45) Date of Patent: May 4, 2004

(54) OZONE GENERATOR

(75) Inventors: Jae Shin Lee, Ulsan (KR); Jae Seok Park, Ulsan (KR); Lukanin Alexandrovich Alexander, Tomsk (RU); Khasanov Leonidovich Oleg, Tomsk (RU); Kwang Ho Kim, Ulsan (KR); Hong Hee Lee, Ulsan (KR); Young Deok Lee, Ulsan (KR)

(73) Assignee: Smart Air, Inc., Ulsan (KR)

( * ) Notice: Subject to any disclaimer, the term of this patent is extended or adjusted under 35 U.S.C. 154(b) by 0 days.

(21) Appl. No.: 09/957,554

(22) Filed: Sep. 19, 2001

(65) Prior Publication Data

US 2002/0039546 A1 Apr. 4, 2002

(30) Foreign Application Priority Data

Sep. 29, 2000 (KR) ........................................ 2000-57190
Nov. 25, 2000 (KR) ........................................ 2000-70701
Sep. 13, 2001 (KR) ........................................ 2001-56403

(51) Int. Cl.[7] ................................................ B01J 19/08
(52) U.S. Cl. ................................................ 422/186.07
(58) Field of Search ................................ 422/186.07

(56) References Cited

U.S. PATENT DOCUMENTS

| RE30,320 E | * | 7/1980 | Lowther | ..................... 204/176 |
| 4,213,838 A | * | 7/1980 | Lowther | ..................... 204/176 |
| 5,529,760 A | * | 6/1996 | Burris | ..................... 422/186.07 |
| 5,908,603 A | | 6/1999 | Tsai et al. | |

FOREIGN PATENT DOCUMENTS

JP           11-11910           1/1999

* cited by examiner

*Primary Examiner*—Kishor Mayekar
(74) *Attorney, Agent, or Firm*—Jones Day

(57) ABSTRACT

There is provided a small and light ozone generating apparatus capable of producing ozone with much less consumption of electric power. The present invention comprises a pulse generator for generating high-voltage pulses and a discharge chamber for inducing electrical discharge in response to the high-voltage pulses. The pulse generator includes an LC circuit for compressing square wave signals and generating impulses. The use of impulse greatly reduces electric power consumption and volume of ozone generating apparatus. Electrical discharge takes place between an electrode plate and grounded chamber wall. A sheet of oxide dielectric covers the chamber wall to prevent corrosion of chamber wall.

15 Claims, 7 Drawing Sheets

OZONE GENERATOR

FIELD OF THE INVENTION

The present invention relates to an ozone generator and, in particular, to a relatively small and light ozone generating system and method capable of producing ozone with much less consumption of electric power.

BACKGROUND OF THE INVENTION

Ozone ($O_3$), triatomic form of oxygen, has very strong oxidant properties as it is particularly unstable and tends to reduce to diatomic molecule of oxygen ($O_2$) under the normal temperature and pressure. Common uses for ozone include water or air purification, deodorization and bleaching. A wide variety of methods have been proposed to increase the ozone generation efficiency. The efficiency depends on a number of factors including the reactant gas concentration, electric power applied, temperature and gas flow rate.

An ozone generator produces ozone by applying strong energy into air that contains oxygen ($O_2$). Depending on how the energy is applied, ozone generators are generally classified into two types. The first type of ozone generators use ultraviolet ray while the second type of ozone generators use a high electric field that induces corona discharge in the air. As for the ultraviolet types, it is difficult to make a small and compact ultraviolet ray lamp that generates ultraviolet ray. Additionally, the lamp is fragile and poor in long-time reliability. Corona discharge types perform better because they are energy efficient, stable and easy to control. Therefore, nowadays most of ozone generators are using corona discharge. Corona-discharging ozone generators usually have a pulse generating circuit for generating high voltage pulses that are essential in initiating discharge. They also have a discharge chamber into which air or pure oxygen is supplied and out of which resultant ozone exit.

Figure 1:
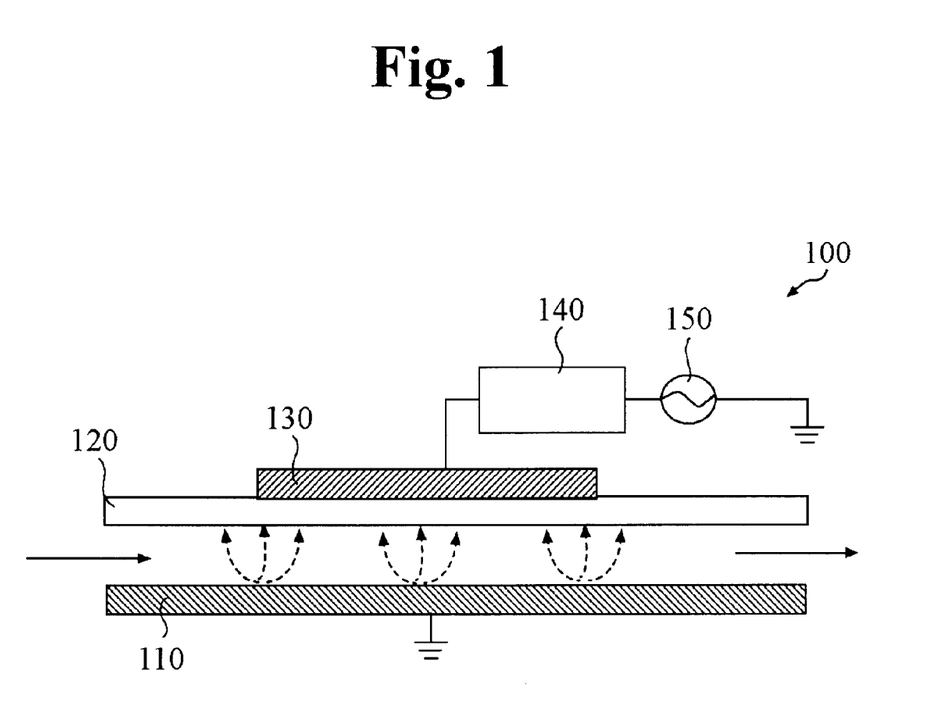
FIG. 1 illustrates a sectional view of a conventional ozone generator.

FIG. 1 illustrates a conventional ozone generating system 100. It is generally comprised of a ground electrode 110, a dielectric layer 120, a high-voltage electrode 130, a high-voltage pulse generator 140 and an AC power source 150. Air is continually supplied into the gap between the grounded electrode 110 and dielectric layer 120 inside a chamber (not shown). When a high voltage is applied between the ground electrode 110 and high-voltage electrode 130, the oxygen in the air oxidizes to become ozone.

In operation, the high-voltage pulse generator 140 receives AC power from the AC source and generates sinusoidal or square wave before amplifying them to a level of 3–20 kV. Thus amplified pulses are applied between the electrodes. The dielectric layer 120 disposed between the two electrodes serves to prevent local arcs and helps to generate uniform plasma over the surface of the electrodes. The high-voltage pulse generator 140 includes a transformer with a high winding ratio in order to get high voltage required for the generation of plasma. One of the problems in using a high winding ratio transformer is an increased size of the transformer, requiring heat dissipation. As a result, power loss is significant.

As an alternative form to the discharge chamber of FIG. 1, tube-type ozone generators with glass or quartz tubular dielectric layer have been proposed and widely used in a large-capacity application. But, the mechanism of generating ozone is similar to that of the previous ozone generators and the overall size of the alternative design ozone generators is still large.

In an ozone generator, a non-negligible portion of input electrical power gets converted to heat energy, raising the temperate of the discharge chamber, and thus lowering the ozone generation efficiency. For at elevated temperatures, ozone reduces back to oxygen much faster. In order to cool the discharge chamber, an air/water cooling device was used, contributing to the increased size and complexity.

Conventionally a dehumidifier has been used in order to supply dry air into the discharge chamber. A humid air causes corrosion of the walls of a discharge chamber because moisture in the humid air reacts with ozone to create nitric acid ($HNO_3$) that shortens the life span of the whole system. Corrosion-resistant stainless steel (e.g. SUS316), which is very expensive, has been used as a material of the chamber walls to combat the corrosion. Any yet it is not permanent and thus requires periodic cleaning or replacement of the discharge chamber. All these attributed to an increase in the production costs.

SUMMARY OF THE INVENTION

It is therefore an objective of the present invention to provide a highly efficient and compact ozone generator.

It is another objective of the present invention to provide an ozone generator that has a longer life span as a whole.

It is still yet another objective of the present invention to provide such an ozone generator that can be manufactured with lower cost.

In accordance with one aspect of the present invention, the ozone generator includes LC circuit for compressing square wave signals and generating impulses. The use of impulses greatly reduces the winding ratio of transformer and thus overall volume of ozone generator. Power consumption can be also largely reduced.

In accordance with another aspect of the present invention, the ozone generator comprises electrode plates disposed parallel to the discharge chamber wall and dielectric plates adhered to electrodes. A plurality of electric fields are formed vertically between chamber wall and plates, thereby generating ozone much more power efficiently. According to this aspect of the present invention, the discharge chamber is provided in a flat form. Therefore, it is possible to make the generator extremely compact and air-cooling much easier without an additional cooling system.

In accordance with yet another aspect of the present invention, a sheet of oxide dielectric covers the chamber wall. The oxide dielectric prevents corrosion of chamber wall and eliminates the need of installing a dehumidifier.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in conjunction with the accompanying drawings in which:

DETAILED DESCRIPTION OF THE INVENTION

Figure 2:
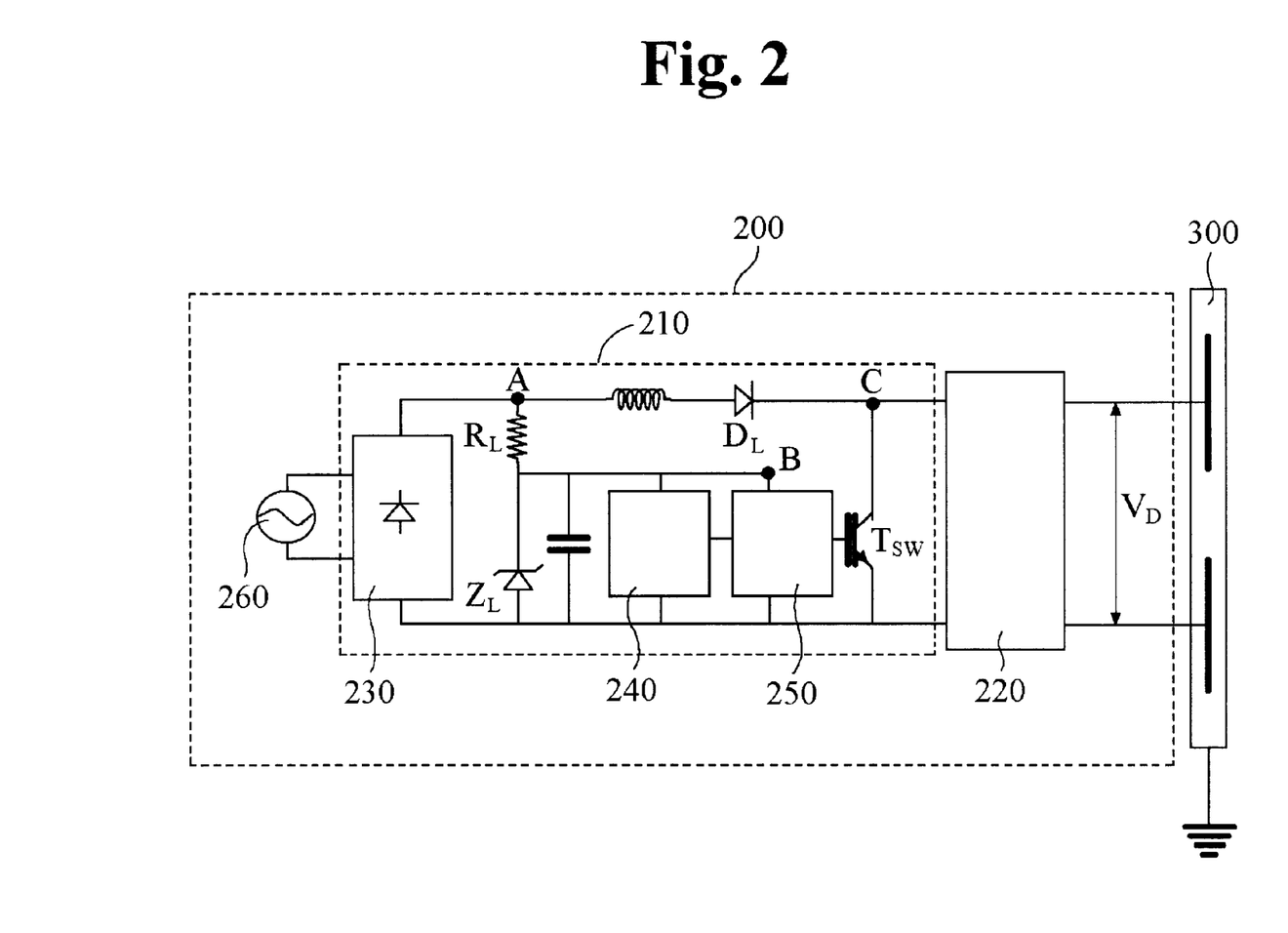
FIG. 2 is a schematic diagram of an ozone generator in accordance with the present invention.

The present invention will be described in reference to accompanying drawings. FIG. 2 schematically illustrates an embodiment of the present invention. It is comprised mainly of an electric circuit 200 and a discharge chamber 300. The electric circuit 200 receives power from an external power source 260 and generates high-voltage impulses that are applied to the discharge chamber. The high-voltage impulses induce plasma in air or oxygen that was supplied into the discharge chamber, and turn the oxygen into ozone.

More specifically, the electric circuit 200 is comprised of a square wave generator 210 and a high-voltage impulse generator 220. Square wave signals output from the square wave generator 210 are compressed by the impulse generator 220 to become high-voltage impulses. An exemplary square wave generator is shown in FIG. 2 as comprised of a rectifier 230, a wave shaper 240, and a gate driver 250 connected to a power-switching transistor (Tsw). Any other known square wave generator may be used.

Figure 3A:
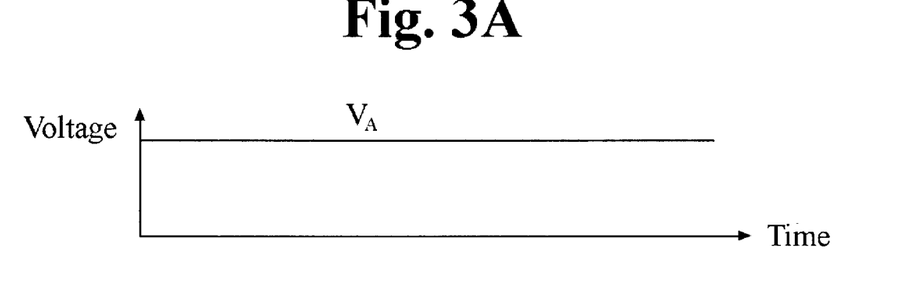
FIGS. 3A–3D depicts waveforms of signals measured at nodes in the electric circuit.
Figure 3B:
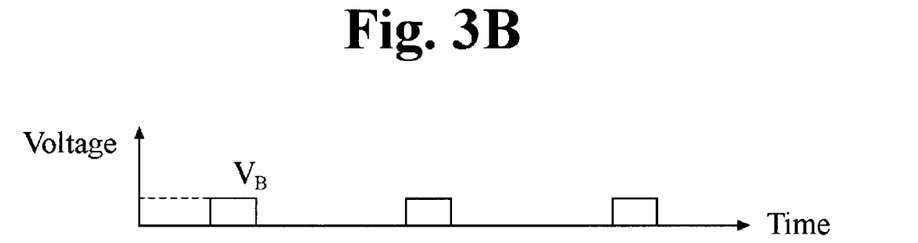
Figure 3C:
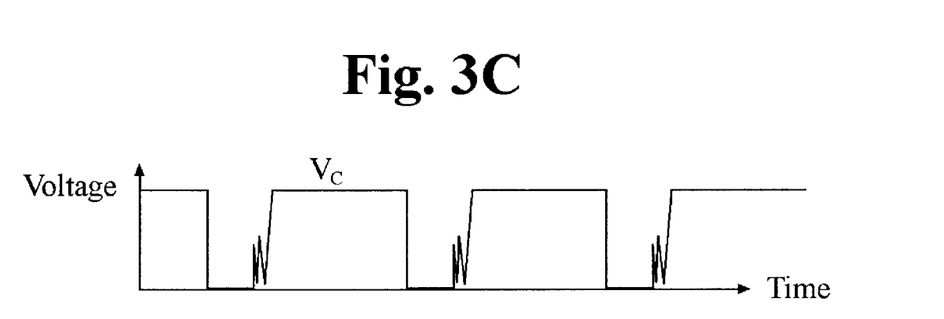

FIGS. 3A–3C respectively represent the signal waveforms at nodes marked by "A", "B", and "C" in FIG. 2. In operation, the AC voltage from the external power source 260 is rectified by the rectifier 230 to a DC voltage, as shown in FIG. 3A. Using the DC voltage, the square wave shaper 240 generates a square wave, as shown in FIG. 3B. The generated square wave signal is fed to the gate driver 250. When driven by the gate driver 250, the transistor Tsw becomes conductive and produces a high-voltage square wave, as shown in FIG. 3C at its drain. The period and width of the wave are determined by the wave shaper 240, which may be a MOSFET IC.

Figure 4:
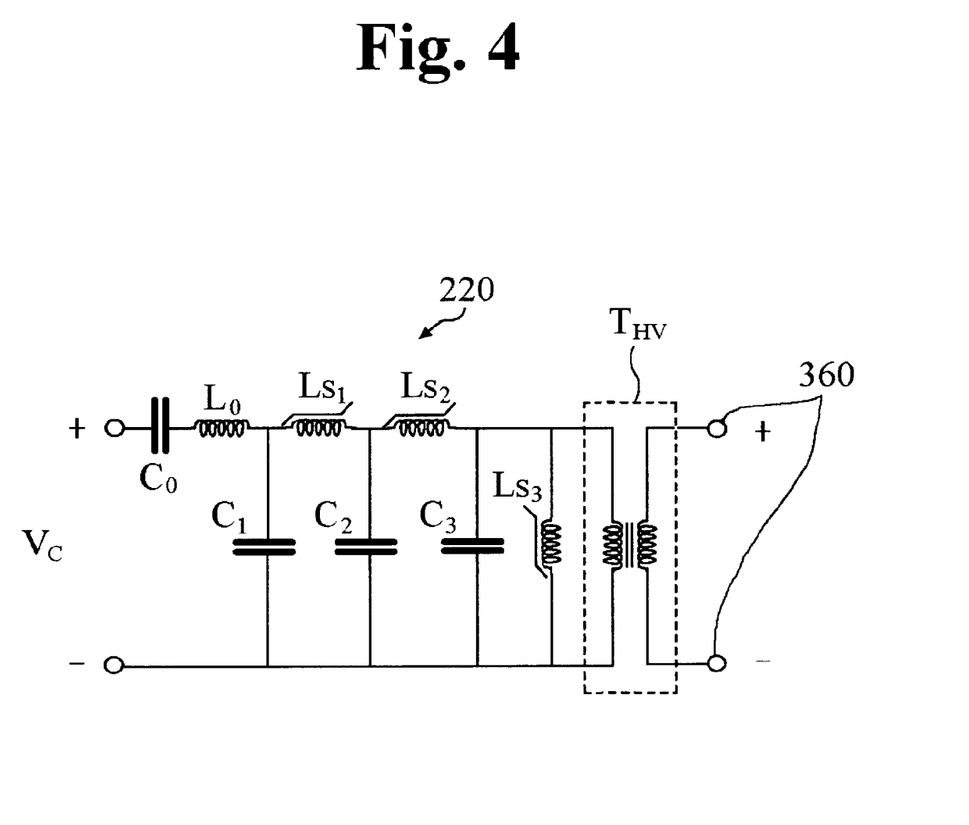
FIG. 4 is a detailed circuit diagram of a high-voltage impulse generator in accordance with the present invention.

FIG. 4 is a circuit diagram of an exemplary high-voltage impulse generator 220 according to the present invention. The high-voltage impulse generator, in response to the square wave received from the transistor Tsw, produces high-voltage impulse signals. It performs the function of a power compression circuit using LC circuits that are normally used in a high-frequency resonance circuit. It is conventionally known that the impedance of an LC resonance circuit does not vary in response to electric field but does vary depending on the frequency of an input signal. However, in a compression circuit used in the present invention, the inductance and capacitance on an LC circuit vary with respect to electric field. In the LC circuit ($C_1$, $Ls_1$) of FIG. 4, as electrical charges accumulate on the capacitor $C_1$, the voltage across the capacitor increases, causing the impedance of the inductor $Ls_1$ to decrease.

Specifically, the impedance ($Z_L$) of an inductor is represented by an equation $Z_L = jwL$, where L is a proportional to permeability $\mu$ of the ferrite core and the number of windings of the coil. It is known that the permeability is influenced by magnetic field because it is proportional to the slope of B-H loop of magnetic flux density (B) and magnetic field strength (H). When the magnetic field strength (H) of a ferrite is low, $\mu$ is large, i.e., in a range of thousands. But if the magnetic field strength increases to reach the saturation range of B-H loop, $\mu$ rapidly decreases close to 1. The inductance of an inductor in the saturation range experiences a rapid decrease along with its impedance, allowing a large current to flow instantly to the next inductor.

Figure 3D:
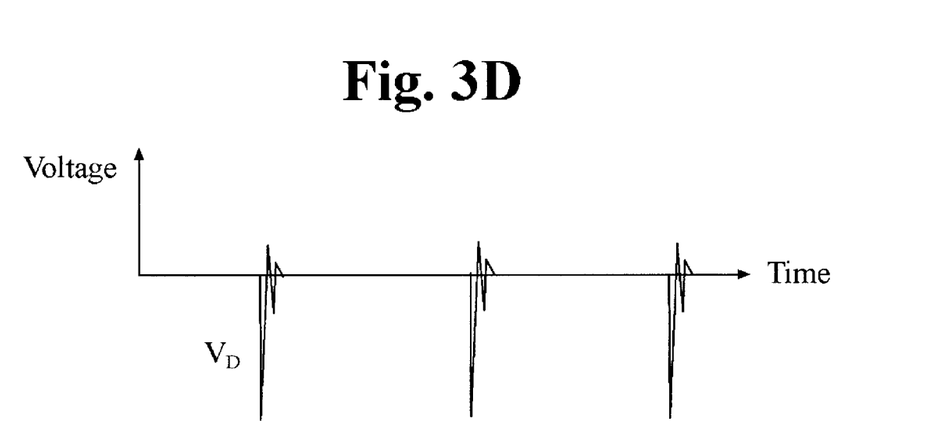

When the square wave, as shown in FIG. 3C, is fed to the high-voltage impulse generator 220, each pulse signal charges capacitor $C_0$ first and then capacitor $C_1$ via a current-limiting inductor $L_0$. As the electrical charge at the capacitor $C_1$ increases, the voltage across capacitor $C_1$ rises. At the moment the voltage reaches its peak the impedance of Ls1 rapidly drops to $\frac{1}{10} \sim \frac{1}{1000}$ of its previous value, provided that the inductance was set such that the ferrite core of $Ls_1$ would reach a saturation range if the voltage of capacitor $C_1$ rose to the peak. The current then flows through inductor $Ls_1$ and charges capacitor $C_2$ rapidly, thereby increasing the voltage across $C_2$ several times higher and greatly reducing the pulse width of the square wave to produce an impulse. If the inductance of $Ls_2$ is also set such that the ferrite core of $Ls_2$ would reach a saturation range if the voltage across capacitor $C_2$ rose to the peak, the voltage across $C_3$ rises even more rapidly and the width of pulse decreases more sharply. $C_3$ and $Ls_3$ are connected in parallel and their capacitance and inductance are set to appropriate values for the impedance matching between the electric circuit 200 and the discharge chamber 300. After going through a high-voltage transformer ($T_{HV}$), the impulse has a high-voltage as shown in FIG. 3D.

Using above steps, a square wave is compressed by greatly reducing the pulse width as well as increasing the pulse amplitude. Finally, impulses having a very high-voltage can be generated without a high winding ratio transformer and as a result, the overall system becomes more compact.

The actual peak voltage of the impulses delivered to the discharge chamber may depend on the inductance, capacitance and other parameters used in the high-voltage impulse generator 220.

Figure 5:
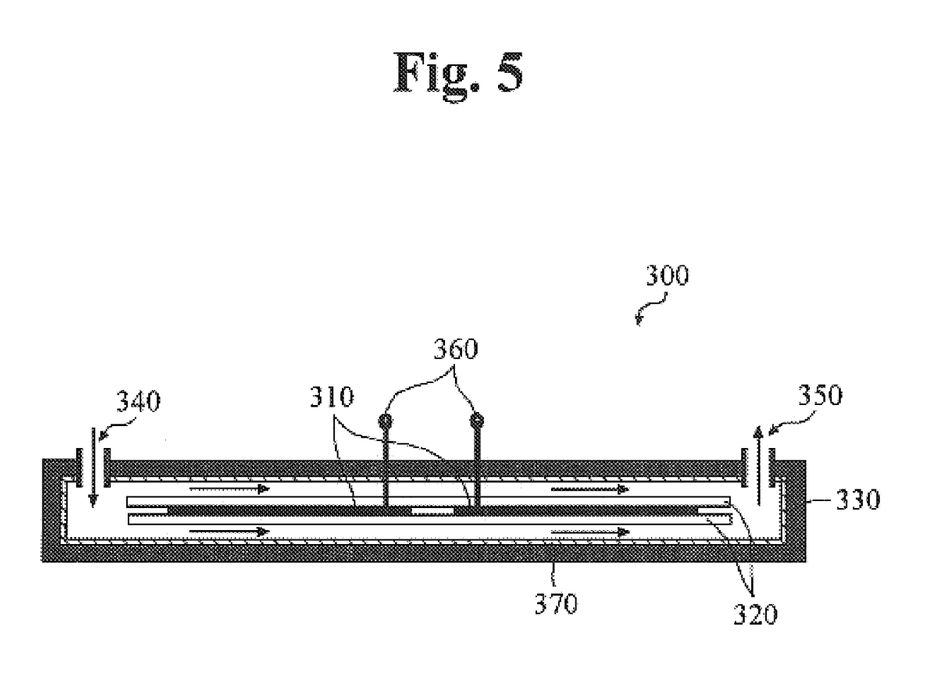
FIG. 5 is a sectional view illustrating a discharge chamber for an ozone generator in accordance with the present invention.

FIG. 5 illustrates an embodiment of a discharge chamber according to the present invention. The discharge chamber is in the form of a flat box, enclosing a pair of electrode plates 310 disposed on a same plane and separated from each other by a predetermined gap. A pair of dielectric plates 320 are air-tightly adhered to the electrode plates with one on the top surfaces of and the other on the bottom surfaces of the electrodes 310. The chamber has an inlet 340 through which air enters the chamber and an outlet 350 through which the generated ozone exits. The chamber walls 330, covered with a sheet of oxide dielectric 370, are grounded. The high-voltage electrode plates are connected to the output terminals 360 of the high-voltage transformer ($T_{HV}$) as shown in FIG. 4.

An oxygen-containing air entering the chamber through the inlet flows in the discharge space between the dielectric plates and the chamber walls. When high-voltage pulses are applied to the electrodes, some oxygen in the air is transformed into ozone, which finds its way out through the outlet. The arrow in the figure represents the direction of flow inside the discharge chamber.

To represent the discharge chamber by an equivalent electric circuit, the discharge chamber may be thought of as a physically huge "capacitor" since the high-voltage electrodes and chamber walls function as the positive and negative electrodes of a capacitor while the air and dielectric plates 320 play the role of dielectric layer of the capacitor.

In this light, the total capacitance of the discharge chamber, prior to discharging, is represented as follows.

$$1/Cc = 1/Ca + 1/Cd \quad (1)$$

where Cc denotes the total capacitance of the discharge chamber, Ca is the capacitance of air gap, and Cd is the capacitance of the dielectric plates.

Once discharge begins, the air gap between the dielectric plates and the chamber walls is in plasma state, causing the air electrically conductive due to the increase of ions. Thus, after discharging, the total capacitance of the discharge chamber is represented as follows.

$$1/Cc \cong 1/Cd \quad (2)$$

The equation (2) indicates that the electric field needed to maintain the discharge is smaller than the initial electric field that started the discharge. Continuing to apply the same high initial voltage to the chamber after discharge began delivers more power than necessary to the chamber, resulting in a partial loss of power and accompanying increased heat generation. Therefore, the application of impulses that have the minimum duty cycle rather than sinusoidal or square wave signals helps to generate ozone much more power efficiently.

To elaborate on the operation of the discharge chamber, when impulses are applied between the pair of the electrodes plate 310, electric fields are formed vertically between the electrodes and the upper/lower chamber walls, inducing plasma. At this time, current flows from the positive electrode to the grounded chamber walls to the negative electrode. Thus, a discharge chamber enclosing a pair of electrodes may be represented by an equivalent circuit comprising a plurality of capacitors, as discussed above.

The dielectric plates 320 air-tightly adhered to the electrodes serve as a discharge barrier to help the discharge to form uniformly throughout the space in the discharge chamber. The dielectric plates and electrodes are preferred to be adhered without any gap between them. Otherwise, undesirable discharge could occur sideways, producing a leakage current between the two electrodes and thus possibly destroying the electrodes and dielectric plates. Even localized gaps between the electrodes and the dielectric plates may cause discharge in the gaps, which not only does not contribute to the generation of ozone but also increase heat.

A sheet of oxide dielectric covers the chamber wall. Since the oxide dielectric is made of an oxide, it is not oxidized by ozone and resistant to strong acids such as nitric acid ($HNO_3$) that is created when moisture in the air reacts with ozone. Thus, the sheet of oxide dielectric prevents corrosion of the chamber walls. Mica may be used as oxide dielectric.

Figure 6:
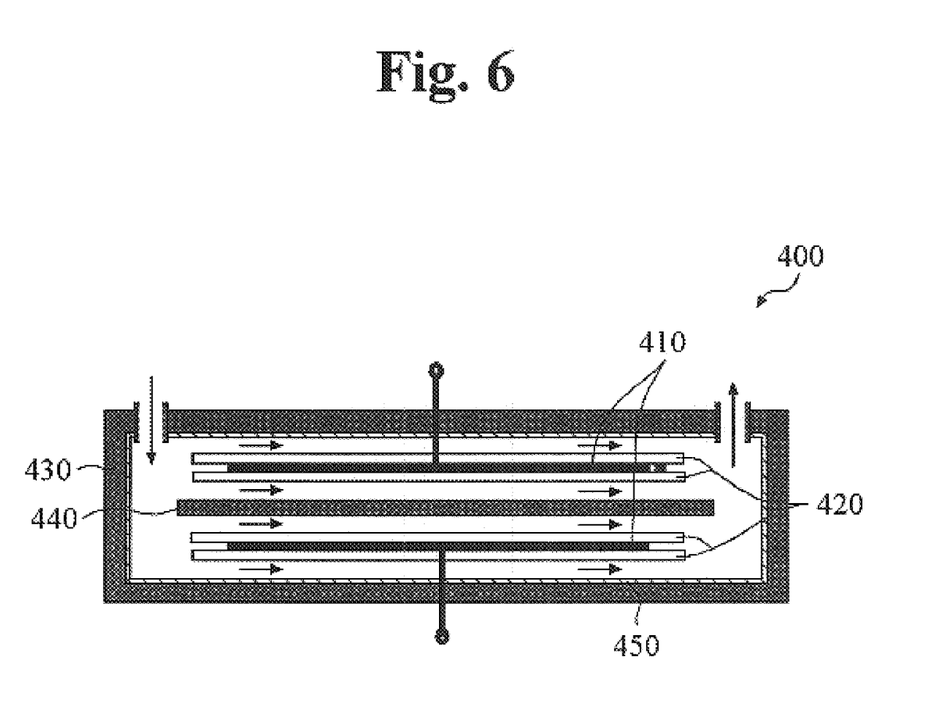
FIG. 6 is a sectional view illustrating another discharge chamber for an ozone generator in accordance with the present invention.

FIG. 6 is another embodiment of a discharge chamber according to the present invention. In this embodiment, the electrodes are disposed not on a same plane but over top of each other. Each electrode is air-tightly sandwiched between a pair of dielectric plates 420. In the space between the upper electrode assembly and the lower electrode assembly is disposed a grounded plate 440 in parallel with the electrodes, shorted to the chamber walls. An oxide dielectric plate 450 covers the chamber wall like in the first embodiment. The capacitance of this discharge chamber is the same as that of the discharge chamber of FIG. 5. Here, electric fields are formed vertically between the chamber wall, the grounded plate 440 and the electrodes.

Figure 7:
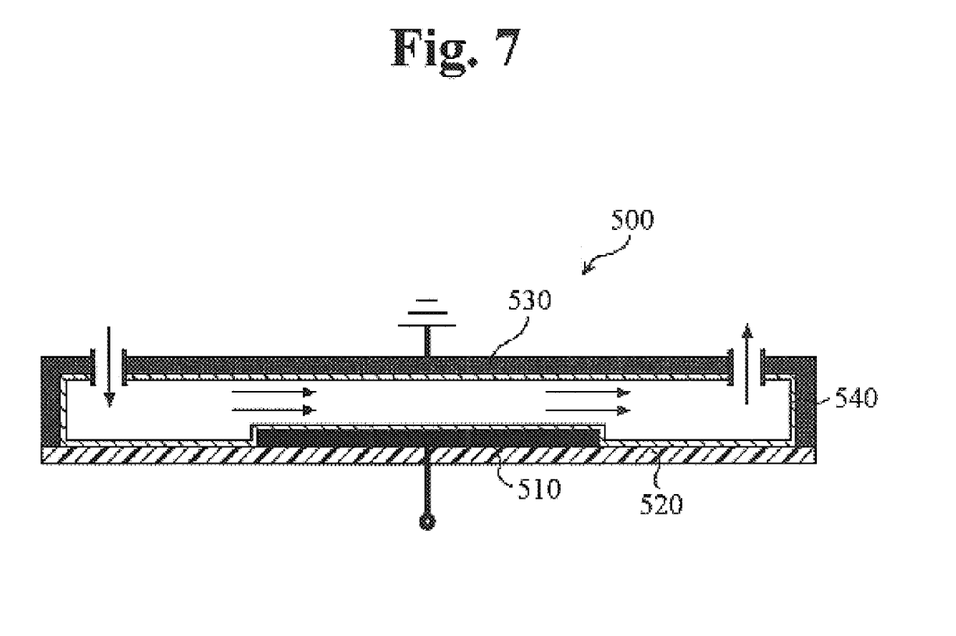
FIG. 7 is a sectional view illustrating yet another discharge chamber for an ozone generator in accordance with the present invention.

FIG. 7 is yet another embodiment of a discharge chamber according to the present invention. In contrast to the above two embodiments, only one electrode is used. The single high-voltage electrode plate is disposed adhesively to the bottom wall 520 of the chamber. The top wall 530 of the chamber is grounded. In this case the bottom wall 520 is made of non-conductive material (e.g. an insulating teflon layer) so as to be electrically decoupled from the rest of the chamber walls. An oxide dielectric plate 540 covers the chamber wall including the electrode. In operation, high-voltage impulses are applied between the top wall 530 and the electrode plate 510 to generate discharge. Since only one electrode plate is needed inside a discharge chamber, this type of discharge chamber can be made much smaller than conventional ones. Also, the necessary voltage levels can be lowered, further allowing a reduction in power consumption. In this embodiment, the high-voltage electrode 510 may be disposed closely to the bottom wall 520 with narrow gap so as not to cause destruction of dielectric.

The inventions will be further illustrated by the following examples of actual reduction. While the examples illustrate the invention, they are not intended to limit its scope.

EXAMPLE #1

The inventor of the present invention measured the volume of ozone produced versus power used when an ozone generator of the first embodiment. An alternating current (AC) of 220 V was rectified to a direct current (DC) of 300 V by a bridge-type rectifier. The DC was converted to a square wave through the wave shaper 240 and a 15 V-breakdown Zener diode and applied to the input of the gate driver 250 for the power transistor (Tsw). Here, the square wave had a pulse width of 2 $\mu$sec and a period of 0.2 msec. Pulses output from the drain of the power transistor in response to the square wave had a peak voltage of 500–600 V. $C_0$, $L_0$, $C_1$, $Ls_1$, $C_2$, $Ls_2$ were set to 0.1~0.2 uF, 0.5 mH, 17 nF, 2~4 mH, 13 nF and 0.1~0.2 mH, respectively. $C_3$ and $Ls_3$ were set such that the impedance of the impulse generator matches that of the discharge chamber. The winding ratio of the transformer $T_{HV}$ was 7~13. As a result, impulses of a peak voltage of 10 kV and FWHM (Full Width at Half Maximum) of 0.25~0.5 $\mu$sec were delivered to the discharge chamber. The dielectric constant and thickness of the dielectric plate adhered on the electrodes was 8.0 and 0.1~0.2 mm respectively. The area of each of the electrodes was 80 mm×40 mm. The gap between the chamber wall and the dielectric plate was 0.5 mm~1 mm. The size of the discharge chamber was 150 mm×150 mm×15 mm and the size of the overall ozone generator was 220 mm×250 mm×125 mm. It consumed 80 W of power. The volume of ozone generated from this ozone generator was measured with a UV sensing method. At the temperature of 25° C. with dry air injected into the discharge chamber at a rate of 20 liters/min ozone was produced at the rate of 3.5~4.5 g/hr. When pure oxygen was supplied under otherwise the same condition, ozone was produced at the rate of 8~12 g/hr. This experiment showed that for the same volume of ozone the power consumed by the inventive ozone generator was as low as one tenth of power required in conventional ozone generators, despite that the apparatus was much smaller.

EXAMPLE #2

The inventor of the present invention also tested the second embodiment as shown in FIG. 6. The operating conditions were the same as those in the first example. It produced almost the same volume of ozone.

According to the present invention, a novel way of greatly reducing power consumption for ozone generation is proposed. However, one skilled in the art would readily appreciate that the present invention is not limited to supplying impulse to discharge chamber but can also be applied to supplying a high-voltage signal having minimum pulse duration required for initiating discharge. Additionally, in order to generate impulse, the present invention is not limited to using LC circuit but can also use other circuits.

While particular embodiments of the present invention have been shown and described, it will be obvious to those skilled in the art that changes and modifications may be made without departing form this invention in its broader aspects and, therefore, the aim in the appended claims is to cover all such changes and modifications, as fall within the true spirit and scope of this invention.

What is claimed is:

1. An apparatus for producing ozone, comprising:
   pulse generating means for generating high-voltage pulses; and
   a discharge chamber for inducing electrical discharge in response to said high-voltage pulses, enclosing a pair of electrode plates and at least one dielectric plate, wherein said discharge chamber has an inlet and an outlet through which oxygen-containing air is supplied into and generated ozone exits respectively, and
   wherein walls of said discharge chamber are covered with oxide layers, and
   wherein said pair of electrode plates is disposed in a plane in parallel with the top and bottom walls of said discharge chamber.

2. The apparatus of claim 1 wherein said pulse generating means includes a square wave generator for generating a square wave from the voltage applied from external power source, wherein said high-voltage pulses are generated by compressing said square wave.

3. The apparatus of claim 2, wherein said pulse generating means further includes an LC circuit having a plurality of inductor/capacitor pairs connected in parallel, wherein the inductance of said inductor is set such that said inductor would reach saturation range if the voltage of said capacitor rose to the peak.

4. The apparatus of claim 1, wherein said at least one dielectric plate is adhered to the top and bottom surfaces of each of said pair of electrode plates.

5. The apparatus of claim 1, wherein said walls of said discharge chamber are grounded and said high-voltage pulses are applied between said pair of electrode plates, wherein said electrical discharge takes place between said pair of electrode plates and said walls.

6. The apparatus of claim 1 wherein said oxide layers are made of mica.

7. An apparatus for producing ozone, comprising:
   pulse generating means for generating high-voltage pulses; and
   a discharge chamber for inducing electrical discharge in response to said high-voltage pulses, enclosing a pair of electrode plates and at least one dielectric plate, wherein said discharge chamber has an inlet and an outlet through which oxygen-containing air is supplied into and generated ozone exits respectively, and
   wherein walls of said discharge chamber are covered with oxide layers, and
   wherein the electrode plates are spaced apart and parallel to one another and to the top and bottom walls of said discharge chamber and a grounded plate is disposed between said pair of electrode plates.

8. The apparatus of claim 7, wherein said at least one dielectric plate is adhered to the top and bottom surfaces of each of said pair of electrode plates.

9. The apparatus of claim 7, wherein said walls of said discharge chamber are grounded and said high-voltage pulses are applied between said pair of electrode plates, wherein said electrical discharge takes place between each of said pair of electrode plates and one of said walls as well as between each of said pair of electrode plates and said grounded plate.

10. The apparatus of claim 7 wherein said oxide layers are made of mica.

11. The apparatus of claim 7 wherein said pulse generating means includes a square wave generator for generating a square wave from the voltage applied from external power source, wherein said high-voltage pulses are generated by compressing said square wave.

12. An apparatus for producing ozone, comprising:
    pulse generating means for generating high-voltage pulses; and
    a discharge chamber for inducing electrical discharge in response to said high-voltage pulses, enclosing one electrode plate and at least one dielectric plate, wherein said discharge chamber has an inlet and an outlet through which oxygen-containing air is supplied into and generated ozone exits respectively, and
    wherein said one electrode plate is adhered to the bottom wall of said discharge chamber, and
    wherein said one electrode plate and walls of said discharge chamber are covered with an oxide layer.

13. The apparatus of claim 12, wherein an upper wall of said discharge chamber is grounded and said high-voltage pulses are applied between said electrode plate and said upper wall, wherein said electrical discharge takes place between said one electrode plate and said upper wall.

14. The apparatus of claim 12 wherein said oxide layers are made of mica.

15. The apparatus of claim 12 wherein said pulse generating means includes a square wave generator for generating a square wave from the voltage applied from external power source, wherein said high-voltage pulses are generated by compressing said square wave.

* * * * *